United States Patent
Roh

(10) Patent No.: US 12,065,131 B2
(45) Date of Patent: Aug. 20, 2024

(54) METHOD AND APPARATUS FOR CONTROLLING PARKING OF VEHICLE

(71) Applicant: HYUNDAI MOBIS CO., LTD., Seoul (KR)

(72) Inventor: Hee Chang Roh, Suwon-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 486 days.

(21) Appl. No.: 17/443,555

(22) Filed: Jul. 27, 2021

(65) Prior Publication Data
US 2022/0024450 A1    Jan. 27, 2022

(30) Foreign Application Priority Data

Jul. 27, 2020 (KR) .......................... 10-2020-0092778

(51) Int. Cl.
| | |
|---|---|
| *B60W 30/06* | (2006.01) |
| *B60W 50/00* | (2006.01) |
| *B60W 50/14* | (2020.01) |
| *G06N 3/04* | (2023.01) |
| *G06N 3/08* | (2023.01) |

(52) U.S. Cl.
CPC ........ *B60W 30/06* (2013.01); *B60W 50/0097* (2013.01); *B60W 50/14* (2013.01); *G06N 3/04* (2013.01); *G06N 3/08* (2013.01); *B60W 2050/146* (2013.01); *B60W 2420/408* (2024.01); *B60W 2420/54* (2013.01); *B60W 2555/20* (2020.02)

(58) Field of Classification Search
CPC .. B60W 30/06; B60W 50/0097; B60W 50/14; B60W 2050/146; B60W 2420/52; B60W 2420/54; B60W 2555/20; B60W 40/02; B60W 2554/805; G06N 3/04; G06N 3/08; B62D 15/0285
See application file for complete search history.

(56) References Cited

U.S. PATENT DOCUMENTS

| | | | | |
|---|---|---|---|---|
| 2002/0033940 A1* | 3/2002 | Hedges | ................ | G01C 15/002 356/141.4 |
| 2015/0344028 A1* | 12/2015 | Gieseke | .............. | B60W 30/095 348/148 |

FOREIGN PATENT DOCUMENTS

CN    110794848 A  *  2/2020

OTHER PUBLICATIONS

CN110794848 (A)—English Translation (Year: 2019).*

* cited by examiner

*Primary Examiner* — Ian Jen
*Assistant Examiner* — Renee LaRose
(74) *Attorney, Agent, or Firm* — NSIP Law

(57) ABSTRACT

A method and apparatus for controlling parking are disclosed, where the apparatus includes a location receiver configured to receive location information of the vehicle, a sensor unit disposed in the vehicle to detect surrounding obstacles of the vehicle and the sun, a parking control initiator configured to receive an input signal for parking control of the vehicle and to determine whether to start a parking control operation, an input configured to allow a driver to input the input signal for the parking control, and a parking controller configured to calculate and generate an elevation angle and an azimuth of the sun based on the location information of the vehicle and location information of the sun, to predict a movement of shadows due to an object detected by the sensor unit based on the elevation angle and the azimuth, and to calculate a duration of the shadows on a prospective parking place based on a predicted movement of the shadows.

11 Claims, 3 Drawing Sheets

METHOD AND APPARATUS FOR CONTROLLING PARKING OF VEHICLE

CROSS-REFERENCE TO RELATED APPLICATIONS

This application is based on, and claims priority from, Korean Patent Application Number 10-2020-0092778, filed Jul. 27, 2020, the disclosure of which is incorporated by reference herein in its entirety.

BACKGROUND

Field

The present disclosure in some embodiments relates to a method and an apparatus for controlling the parking of a vehicle.

Description of Related Art

The statements in this section merely provide background information related to the present disclosure and do not necessarily constitute prior art.

Parking space shortage is an ever-present problem. To solve the shortage of parking spaces, the parking sections, each allocated for each vehicle to park, are getting narrower, and even an unmarked parking space gets easily overcrowded by multiple vehicles with little gaps to spare therebetween.

Under the parking space restraints, one who chooses to park a vehicle outdoors frequently confronts minor and major incidents. For example, when left in the vehicle during outdoor parking, the elderly or handicapped or infants may be dangerously exposed to temperature surged or plunged. In a high-temperature environment, the driver when parking outdoors tries to find a shaded space. However, as the sun moves, so does the shaded space, leaving the vehicle eventually exposed to the sun to bear risks of even lethal temperature rise inside the vehicle.

Further, into the age of eco-friendly mobility, some vehicles are launched with sunroofs replaced by top solar panels which solicit the vehicles to be parked at a shadowless site for sunlight to best provide the solar charge.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an apparatus for controlling parking of a vehicle, including a location receiver configured to receive location information of the vehicle, a sensor unit disposed in the vehicle to detect surrounding obstacles of the vehicle and the sun, a parking control initiator configured to receive an input signal for parking control of the vehicle and to determine whether to start a parking control operation, an input configured to allow a driver to input the input signal for the parking control, and a parking controller configured to calculate and generate an elevation angle and an azimuth of the sun based on the location information of the vehicle and location information of the sun, to predict a movement of shadows due to an object detected by the sensor unit based on the elevation angle and the azimuth, and to calculate a duration of the shadows on a prospective parking place based on a predicted movement of the shadows.

The input may include a mode input unit configured to set a mode from among a high-temperature environment mode, a low-temperature environment mode, and a sunlight mode and, wherein the parking controller may be configured to determine a space to form a longest-lasting shadow as an available parking space, in response to the mode being set to the high-temperature environment mode, determine a space to form a shortest-lasting shadow as the available parking space, in response to the mode being set to the low-temperature environment mode, and determine a space to form the shortest-lasting shadow as the available parking space, in response to the mode being set to the sunlight mode.

The apparatus may include a display configured to display a location of the available parking space determined by the parking controller.

The parking controller may include a solar position calculator configured to generate the elevation angle and the azimuth, a shadow formation predictor configured to calculate a duration of the shadows in an available parking space for the vehicle using the elevation angle and the azimuth of the sun and detection information of the object detected by the sensor unit, and a parking space determinator configured to determine the available parking space based on the duration of shadows.

The sensor unit may include an image sensor, and one or more of a radar sensor, a lidar sensor, and an ultrasonic sensor.

The parking controller may be configured to calculate and generate the elevation angle and the azimuth by using the location receiver and the image sensor, and to detect the object using one or more of the radar sensor, the lidar sensor, the image sensor, and the ultrasonic sensor.

In another general aspect, there is provided a method of controlling parking of a vehicle, the method including receiving location information of the vehicle, detecting an object around the vehicle, receiving a command from a driver to begin a parking control operation, determining an elevation angle and an azimuth of the sun based on the location information of the vehicle, and predicting a movement of shadows due to the object based on calculated elevation angle and azimuth of the sun.

The detecting of the object may include detecting the object using one or more of a radar sensor, a lidar sensor, and an ultrasonic sensor.

Based on a prediction of the movement of shadows of the object, the method may include determining a space to form a longest-lasting shadow as an available parking space, in response to the vehicle having a surrounding temperature higher than a threshold, and determining a space to form a shortest-lasting shadow as an available parking space, in response to the vehicle having the surrounding temperature lower than the threshold.

The method may include displaying a location of the available parking space to a driver through a display.

The determining of the elevation angle and the azimuth further may include terminating the determining, in response to the parking control operation commencing and the vehicle being located indoors.

Other features and aspects will be apparent from the following detailed description, the drawings, and the claims.

Figure 1:
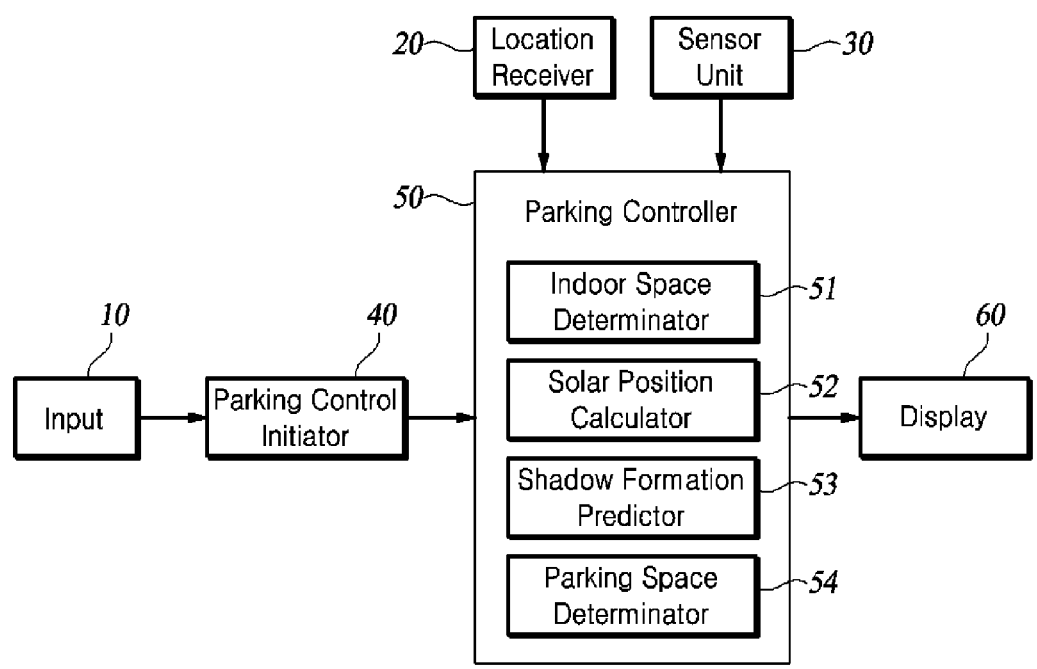
FIG. 1 is a block diagram of a parking control apparatus according to at least one embodiment of the present disclosure.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The present disclosure seeks to prevent a vehicle from having a sudden temperature rise or drop of the vehicle by detecting the positions of the sun and obstacles before the driver parks the vehicle outdoors and calculating the duration of shadows on a prospective parking space.

Additionally, the present disclosure seeks to efficiently charge a battery of a vehicle when installed with a top solar panel during parking by sunlight by searching for a parking space to form a shortest-lasting shadow.

Some exemplary embodiments of the present disclosure are described below with reference to the accompanying drawings. In the following description, like reference numerals preferably designate like elements, although the elements are shown in different drawings. Further, in the following description of some embodiments, a detailed description of known functions and configurations incorporated herein will be omitted for the purpose of clarity and for brevity.

Additionally, alphanumeric codes such as first, second, i), ii), a), b), etc., in numbering components are used solely for the purpose of differentiating one component from the other but not to imply or suggest the substances, the order, or sequence of the components. Throughout this specification, when parts "include" or "comprise" a component, they are meant to further include other components, not excluding thereof unless there is a particular description contrary thereto.

FIG. 1 is a block diagram of a parking control apparatus according to at least one embodiment of the present disclosure.

As shown in FIG. 1, a parking control apparatus may include all or some of an input 10, a location receiver 20, a sensor unit 30, and a parking control initiator 40, a parking controller 50, and a display 60.

The location receiver 20 receives location information of the vehicle. The location receiver 20 may include a global positioning system (GPS) receiver that calculates the position of a vehicle by performing communications with a plurality of satellites. The location receiver 20 may be a navigation device or a high-definition map (HD-map) disposed on the vehicle. Here, HD-map is a high-precision map, which refers to a map for providing detailed information on surrounding roads and topography to an autonomous driving vehicle, and generally has an accuracy within a margin of error of 10 cm.

The sensor unit 30 is disposed on the vehicle to detect the obstacles surrounding the vehicle and the sun. The sensor unit 30 includes one or more image sensors. Additionally, the sensor unit 30 may further include at least one of a radar sensor, a lidar sensor, and an ultrasonic sensor.

The radar sensor is a device that detects the position of an object by using a reflection wave of a transmitted radar signal. To prevent the transmitted radar signal and the received reflected signal from being indistinguishably overlapped, such a radar sensor may use the Doppler effect, timely change the frequency of the transmitted radar signal, or output and transmit the radar signal as a pulse wave.

The radar sensor in the sensor unit 30 may include a plurality of transmitters and a plurality of receivers. The radar signal transmitted from the transmitter of the radar sensor may be received by all of the plurality of receivers. In other words, the radar sensor may have a radar structure of a multi-input multi-output (MIMO) system. The radar sensor may have a field of view (FOV) of 140 degrees to 160 degrees.

The radar sensor may be an ultra-wideband (UWB) radar sensor for transmitting and receiving radar signals in an ultra-wide frequency band or a frequency-modulated continuous-wave (FMCW) radar sensor for transmitting and receiving radar signals including frequency-modulated signals. The radar sensor may use its internal amplifier for adjusting the output values of transmission signals and thereby adjusting a detection range.

The lidar sensor is a non-contact distance detection sensor using the principle of a laser radar. The lidar sensor may include a transmitting unit for transmitting a laser and a receiving unit for receiving a return laser after being reflected on the surface of an object existing within the sensor range. Here, the laser may be a single laser pulse. The lidar sensor has higher detection accuracy in the transverse direction than the radar sensor.

The ultrasonic sensor first generates ultrasonic waves for a certain time and then detects a signal that is reflected and returned by an object. The ultrasonic sensor may be used to determine the presence or absence of an obstacle within a short range.

Components of the sensor unit 30, which are multiple radar sensors, multiple lidar sensor, and multiple ultrasonic sensors may be disposed on the front, rear, and left and right surfaces of the vehicle. The sensor unit 30 may be used for providing various functions such as a leading vehicle auto-follow or tracking function, a blind spot detection function, an emergency collision-prevention function, and a parking collision prevention function.

The input 10 is disposed in the vehicle for allowing the driver to input an input signal for parking control. The input 10 may be a touch panel integrally provided with the display 60 or at least one physical button for changing setting values of various functions.

The input 10 may further include a mode input unit for the driver to set a criterion for determining an available parking space to either a high-temperature environment mode or a low-temperature environment mode. When set to the high-temperature environment mode, the parking controller 50 determines a space to form the longest-lasting shadows as an available parking space. On the other hand, when set to the low-temperature environment mode, the parking controller 50 determines a space to form the shortest-lasting shadows as an available parking space. Additionally, where the vehicle is provided with a top solar panel, the driver may have an option in the input 10 to set the criterion to a sunlight mode. When set to the sunlight mode, the parking controller 50 determines a space to form the shortest-lasting shadows as the available parking space regardless of the temperature of the external environment of the vehicle.

The parking control initiating unit 40 determines whether to start a parking control operation by obtaining an input signal for parking control of the vehicle. Upon receiving, from the input 10, a signal to start the parking control operation, the parking control initiator 40 starts the parking control operation. When starting the parking control operation, the parking control initiating unit 40 transmits a control signal to the parking controller 50.

The parking controller 50 includes all or some of an indoor space determinator 51, a solar position calculator 52, a shadow formation predictor 53, and a parking space determinator 54. When the parking control operation is started, the parking controller 50 calculates the elevation angle and azimuth of the sun by using the location information of the vehicle and the location information of the sun and predicts, based on the sun's elevation angle and azimuth, the movement of the shadows of the surrounding obstacles or objects around the vehicle that are detected by the sensor unit 30. The parking controller 50 calculates the duration of shadows on the prospective parking place based on the predicted movement of the shadows.

The indoor space determinator 51 determines whether or not the vehicle is located indoors based on a signal about an obstacle detected, received from the sensor unit 30. When the indoor space determinator 51 determines that the vehicle is located indoors, no further determination is needed on events, such as duration of shadows. The parking controller 50 does not need to predict shadow formation based on the positions of the sun and obstacles when the indoor space determinator 51 determines that the vehicle is located indoors.

The solar position calculator 52 calculates an elevation angle and an azimuth of the sun. The solar position calculator 52 obtains the position information of the sun by using the image sensor included in the sensor unit 30 and receives data on the position and direction of the vehicle from the location receiver 20. In short, the solar position calculator 52 calculates an elevation angle and azimuth of the sun by using the image sensor and the location receiver 20.

The shadow formation predictor 53 calculates the duration of shadows in an available parking space for the vehicle by utilizing the elevation angle and the azimuth of the sun and the detection information of the object detected by the sensor unit 30.

The parking space determinator 54 determines an available parking space based on the duration of shadows. The parking space determinator 54 may vary the criterion for determining an available parking space according to a temperature outside the vehicle. When the temperature outside the vehicle is higher than a preset temperature, the parking space determinator 54 determines a space to form the shortest-lasting shadows as the available parking space. When the temperature outside the vehicle is lower than or equal to the preset temperature, the parking space determinator 54 determines a space to form the longest-lasting shadows as the available parking space.

Additionally, the parking space determinator 54 may vary the criterion for determining the parking space according to the driver's input. For example, when the driver sets the criterion to the high-temperature environment mode through the input 10 reflecting the hot environment, the parking space determinator 54 determines the space to form the longest-lasting shadow as the available parking space. When the driver sets the criterion to the low-temperature environment mode through the input 10, the parking space determinator 54 determines the space to form shortest-lasting shadows as the available parking space. The vehicle may be fitted with a top solar panel. In this case, the driver may set the criterion to the sunlight mode, wherein the parking space determinator 54 determines the space to form the shortest-lasting shadows as the available parking space regardless of the temperature outside the vehicle.

The display 60 is adapted to display, on a screen, the location of the available parking space determined by the parking controller 50. The display 60 may visually inform the driver of the available parking space by displaying the parking space determined by the parking controller 50. The display 60 includes, but is not limited to, a plasma display panel, a liquid crystal display panel, an electroluminescence panel, an electrophoretic display panel, and an electrochromic display panel, a light emitting diode panel, and an organic light emitting diode panel.

Figure 2:
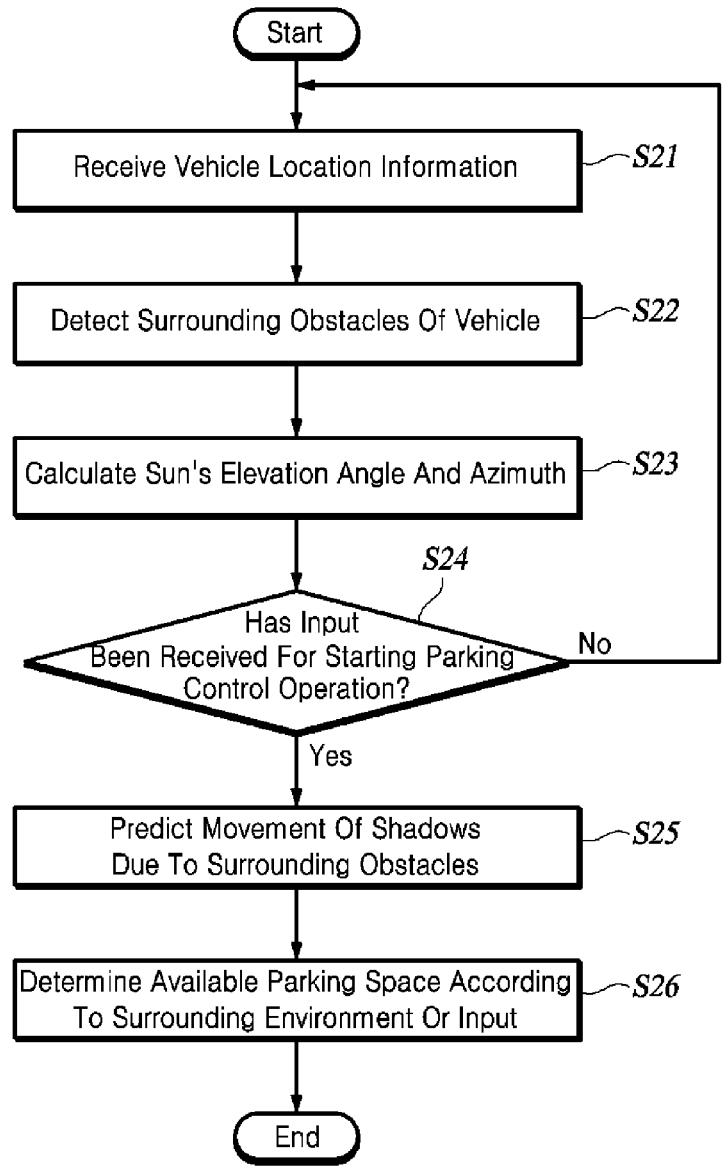
FIG. 2 is a flowchart of a parking control method according to another embodiment of the present disclosure.

FIG. 2 is a flowchart of a parking control method according to another embodiment of the present disclosure.

The parking controller 50 receives location information of the vehicle while the vehicle is driving (S21). The vehicle location information may be received by using a GPS device. The vehicle location information includes not only the location of the vehicle but also information on the azimuth in front of the vehicle. The vehicle location information may be periodically received at preset time intervals.

The parking controller 50 detects the surrounding obstacles or surrounding objects, which may hereafter be referred to as surrounding obstacles of the vehicle (in Step S22). Surrounding obstacles of the vehicle are detected by using one or more of an image sensor, a radar sensor, a lidar sensor, and an ultrasonic sensor.

The parking controller 50 calculates the elevation angle and azimuth of the sun based on the position of the vehicle (S23). The elevation angle and azimuth of the sun are calculated using the sensor unit 30 and the location receiver 20 disposed in the vehicle. The position of the sun may be detected by using the image sensor within the sensor unit 30, and an elevation angle and azimuth of the sun may be calculated based on the detected position of the sun and the position information of the vehicle. After calculating the sun's elevation angle and azimuth, the parking controller 50 may also predict the sun's travel path. The sun's elevation angle and azimuth and the sun's travel path are used to predict the duration of shadows in the parking space. Although FIG. 2 illustrates Steps S21, S22, and S23 as being performed in sequence, the parking control method of the present disclosure can be successfully achieved by performing the illustrated steps in any order.

After performing Steps S21 to S23, the parking controller 50 determines whether or not an input has been received for starting the parking control operation (S24). The start signal for the parking control operation may be directly inputted by the driver using the input 10. The input 10 may be a touch panel integrally provided with the display 60 or at least one physical button for changing setting values of various functions. Upon determining that the driver has not initiated the parking control operation through the input 10, the parking controller 50 to Step S21.

Upon determining that the driver has initiated the parking control operation through the input 10, the parking controller 50 predicts the movement of shadows based on the positions of the surrounding obstacles and the position of the sun which are detected by using the sensor unit 30 (S25). By predicting the movement of shadows, the parking controller 50 may determine the space to form the longest-lasting shadows and the space to form the shortest-lasting shadows.

After predicting the movement of shadows in the parking spaces, the parking controller 50 determines an available parking space according to the surrounding environment of the vehicle or the driver's input (S26). Here, the surrounding environment of the vehicle means the temperature environments around the vehicle. When it is determined that the temperature around the vehicle is higher than the preset temperature, the present disclosure determines the space to form the longest-lasting shadows as the available parking space. On the other hand, when it is determined that the temperature around the vehicle is lower than the preset temperature, the space to form the shortest-lasting shadows is determined as the available parking space.

The available parking space may be determined according to an input from the driver other than the surrounding environment of the vehicle. When the driver enters the high-temperature environment mode reflecting the hot temperature, the present disclosure determines the place to form the longest-lasting shadows as the available parking space. On the other hand, when the driver enters the low-temperature environment mode to reflect the cold temperature, the present disclosure determines the place to form the shortest-lasting shadows as the available parking space. Here, the high-temperature environment mode is a mode that can be selected by the driver when subjectively determining that the temperature around the vehicle is high, and the low-temperature environment mode is a mode that the driver can select by making a subjective determination that the temperature around the vehicle is low. Additionally, with a top solar panel installed on the vehicle, the driver may be allowed to select a sunlight mode and thereby charge an onboard battery by using sunlight while parking the vehicle. When the driver enters the sunlight mode, the present disclosure determines the space to form the shortest-lasting shadows as the available parking space regardless of the temperature environments around the vehicle. After determining the available parking space, this method algorithm ends.

Figure 3:
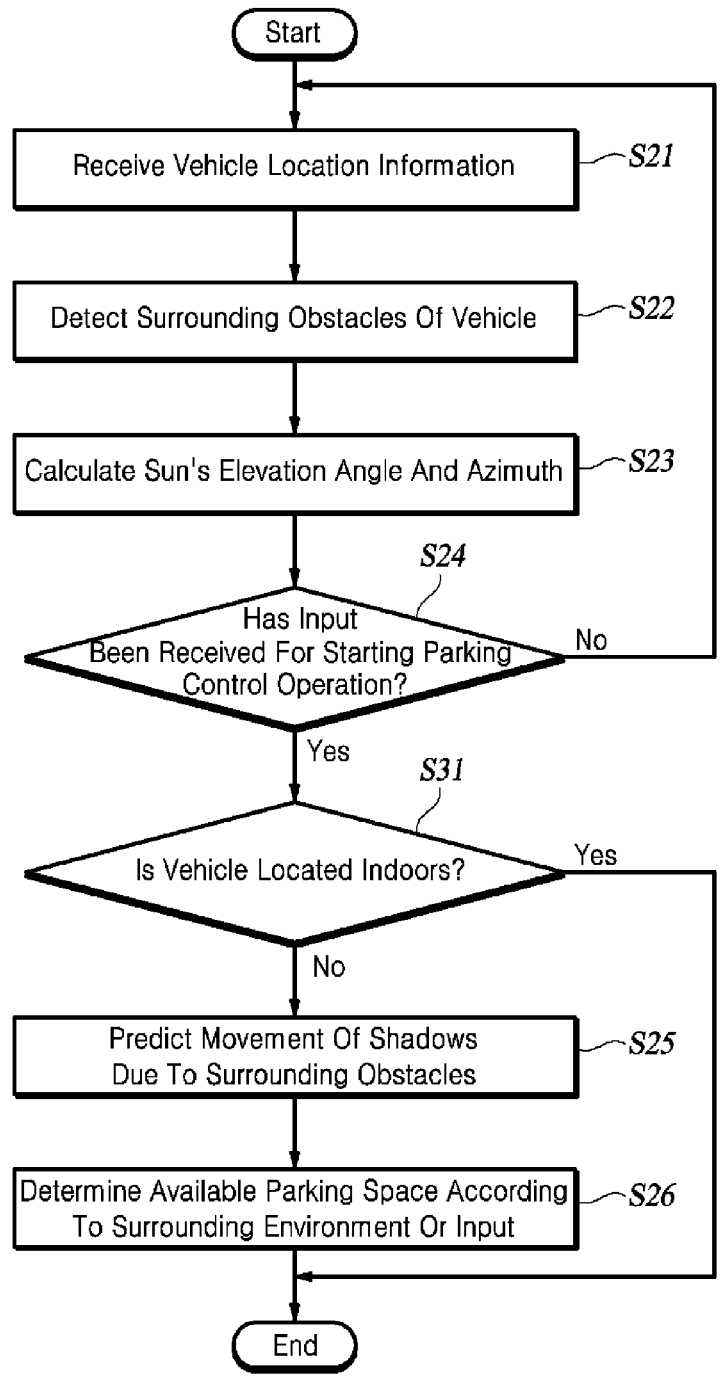
FIG. 3 is a flowchart of a parking control method according to yet another embodiment of the present disclosure.

FIG. 3 is a flowchart of a parking control method according to yet another embodiment of the present disclosure. Based on the contents disclosed in FIG. 2, the repetitive description of the embodiment of FIG. 3 will be omitted.

As shown in FIG. 3, the parking controller 50 determines whether the driver inputs the start signal of the parking control operation (S24), and if yes, it further determines whether the vehicle is located indoors (S31). Whether the vehicle is indoors may be determined by using the sensor unit 30. For example, by using one or more of a radar sensor or a lidar sensor in the sensor unit 30, the surrounding obstacles are detected, and the parking controller 50 determines, based on the detected obstacles, whether or not the vehicle is in a closed space. When the vehicle is determined to be indoors, it does not pay to predict the formation of shadows, so the method algorithm ends.

Upon determining that the vehicle is not located indoors, the parking controller 50 proceeds to Step S25 and performs the step of predicting the movement of shadows due to the surrounding obstacles.

As described above, according to some embodiments of the present disclosure, the parking control apparatus is capable of detecting the positions of the sun and obstacles, calculating the duration of shadows in a prospective parking space, and preventing a sudden rise or drop in the vehicle's temperature according to the surrounding environment of the vehicle or the driver's needs.

Additionally, when used for a vehicle installed with a top solar panel for charging a connected battery, the parking control apparatus is capable of detecting the positions of the sun and obstacles, calculating the duration of shadows in the prospective parking space, and determining, responsive to a sunlight mode inputted by the driver, a space to form a shortest-lasting shadow as an available parking space, thereby efficiently charging the battery.

| REFERENCE NUMERALS | |
| --- | --- |
| 10: input | 20: location receiver |
| 30: sensor unit | 40: parking controller |
| 50: parking controller | 60: display |

While this disclosure includes specific examples, it will be apparent after an understanding of the disclosure of this application it will be apparent that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus for controlling parking of a vehicle, comprising:
   a location receiver configured to receive location information of the vehicle;
   a sensor unit disposed in the vehicle to detect surrounding obstacles of the vehicle and the sun;
   a parking control initiator configured to receive an input signal for parking control of the vehicle and to determine whether to start a parking control operation;
   an input configured to allow a driver to input the input signal for the parking control; and
   a parking controller configured to calculate and generate an elevation angle and an azimuth of the sun based on the location information of the vehicle and location information of the sun, to predict a movement of shadows due to an object detected by the sensor unit based on the elevation angle and the azimuth, and to calculate a duration of the shadows on a prospective parking place based on a predicted movement of the shadows,
wherein the parking controller terminates the prediction, in response to the parking control operation commencing and the vehicle being located indoors.

2. The apparatus of claim 1, wherein the input further comprises a mode input unit configured to set a mode from among a high-temperature environment mode, a low-temperature environment mode, and a sunlight mode and,
wherein the parking controller is further configured to
determine a space to form a longest-lasting shadow as an available parking space, in response to the mode being set to the high-temperature environment mode,
determine a space to form a shortest-lasting shadow as the available parking space, in response to the mode being set to the low-temperature environment mode, and
determine a space to form the shortest-lasting shadow as the available parking space, in response to the mode being set to the sunlight mode.

3. The apparatus of claim 2, further comprising:
a display configured to display a location of the available parking space determined by the parking controller.

4. The apparatus of claim 1, wherein the parking controller comprises:
a solar position calculator configured to generate the elevation angle and the azimuth;
a shadow formation predictor configured to calculate a duration of the shadows in an available parking space for the vehicle using the elevation angle and the azimuth of the sun and detection information of the object detected by the sensor unit; and
a parking space determinator configured to determine the available parking space based on the duration of shadows.

5. The apparatus of claim 1, wherein the sensor unit comprises:
an image sensor; and
one or more of a radar sensor, a lidar sensor, and an ultrasonic sensor.

6. The apparatus of claim 5, wherein the parking controller is further configured
to calculate and generate the elevation angle and the azimuth by using the location receiver and the image sensor, and
to detect the object using one or more of the radar sensor, the lidar sensor, the image sensor, and the ultrasonic sensor.

7. A method of controlling parking of a vehicle, the method comprising:
receiving location information of the vehicle;
detecting an object around the vehicle;
receiving a command from a driver to begin a parking control operation;
determining an elevation angle and an azimuth of the sun based on the location information of the vehicle; and
predicting a movement of shadows due to the object based on calculated elevation angle and azimuth of the sun,
wherein the determining of the elevation angle and the azimuth further comprises:
terminating the determining, in response to the parking control operation commencing and the vehicle being located indoors.

8. The method of claim 7, wherein the detecting of the object comprises:
detecting the object using one or more of a radar sensor, a lidar sensor, and an ultrasonic sensor.

9. The method of claim 7, further comprising:
based on a prediction of the movement of shadows of the object, determining a space to form a longest-lasting shadow as an available parking space, in response to the vehicle having a surrounding temperature higher than a threshold, and determining a space to form a shortest-lasting shadow as an available parking space, in response to the vehicle having the surrounding temperature lower than the threshold.

10. The method of claim 9, further comprising:
displaying a location of the available parking space to a driver through a display.

11. A non-transitory computer-readable storage medium storing instructions that, when executed by a processor, cause the processor to
receive location information of a vehicle;
detect an object around the vehicle;
receive a command from a driver to begin a parking control operation;
determine an elevation angle and an azimuth of the sun based on the location information of the vehicle; and
predict a movement of shadows due to the object based on calculated elevation angle and azimuth of the sun,
wherein the determining of the elevation angle and the azimuth further comprises:
terminating the determining, in response to the parking control operation commencing and the vehicle being located indoors.

* * * * *